United States Patent [19]

Kuroda et al.

[11] Patent Number: 5,381,140
[45] Date of Patent: Jan. 10, 1995

[54] AIRCRAFT POSITION MONITORING SYSTEM

[75] Inventors: Yuichi Kuroda; Yoshikatsu Mizuna, both of Yokohama, Japan

[73] Assignee: Kabushiki Kaisha Toshiba, Kawasaki, Japan

[21] Appl. No.: 19,573

[22] Filed: Feb. 18, 1993

[30] Foreign Application Priority Data

Feb. 18, 1992 [JP] Japan ................................. 4-030547

[51] Int. Cl.⁶ .............................................. G08G 5/04
[52] U.S. Cl. ...................... 340/961; 342/36; 364/439
[58] Field of Search ............... 340/961, 995, 988, 945; 364/439, 461; 342/29, 36, 38, 30

[56] References Cited

U.S. PATENT DOCUMENTS

| | | | |
|---|---|---|---|
| 5,025,382 | 6/1991 | Artz | 340/988 |
| 5,077,673 | 12/1991 | Brodegard et al. | 342/29 |
| 5,111,400 | 5/1992 | Yoder | 364/439 |
| 5,153,836 | 10/1992 | Fraughton et al. | 340/961 |
| 5,181,027 | 1/1993 | Shafer | 340/961 |
| 5,208,591 | 5/1993 | Ybarra et al. | 340/961 |
| 5,317,316 | 5/1994 | Sturm et al. | 342/37 |

OTHER PUBLICATIONS

ICAO Circular 226-AN/135, 1990, pp. i-27, "Automatic Dependent Surveillance."

*Primary Examiner*—Brent Swarthout
*Attorney, Agent, or Firm*—Oblon, Spivak, McClelland, Maier & Neustadt

[57] ABSTRACT

There is provided an aircraft position monitoring system for monitoring the position of aircraft in a ground station. An air-borne sub-system mounted in the aircraft acquires, automatically and periodically, monitor data including data on the aircraft position, ID and FOM. The acquired monitor data is transmitted to the ground station via a satellite communication line or a data communication line. In the ground station, the monitor data sent from the aircraft is sent to a monitoring device and a tracking processing unit. The resultant data is displayed on a display device. The tracking processing unit collates the input monitor data with track data in a track file prepared on the basis of flight schedule data of the aircraft, and determines presence/absence of correlation therebetween by referring to FOM data in the monitor data. On the basis of the determination result, the existing track file is updated or a new track file is prepared. Thus, the tracking processing of each aircraft is performed. The display device shows position and ID data relating to the aircraft, the tracking processing of which has been performed by the tracking processing unit, in a mode which can be easily recognized.

2 Claims, 5 Drawing Sheets

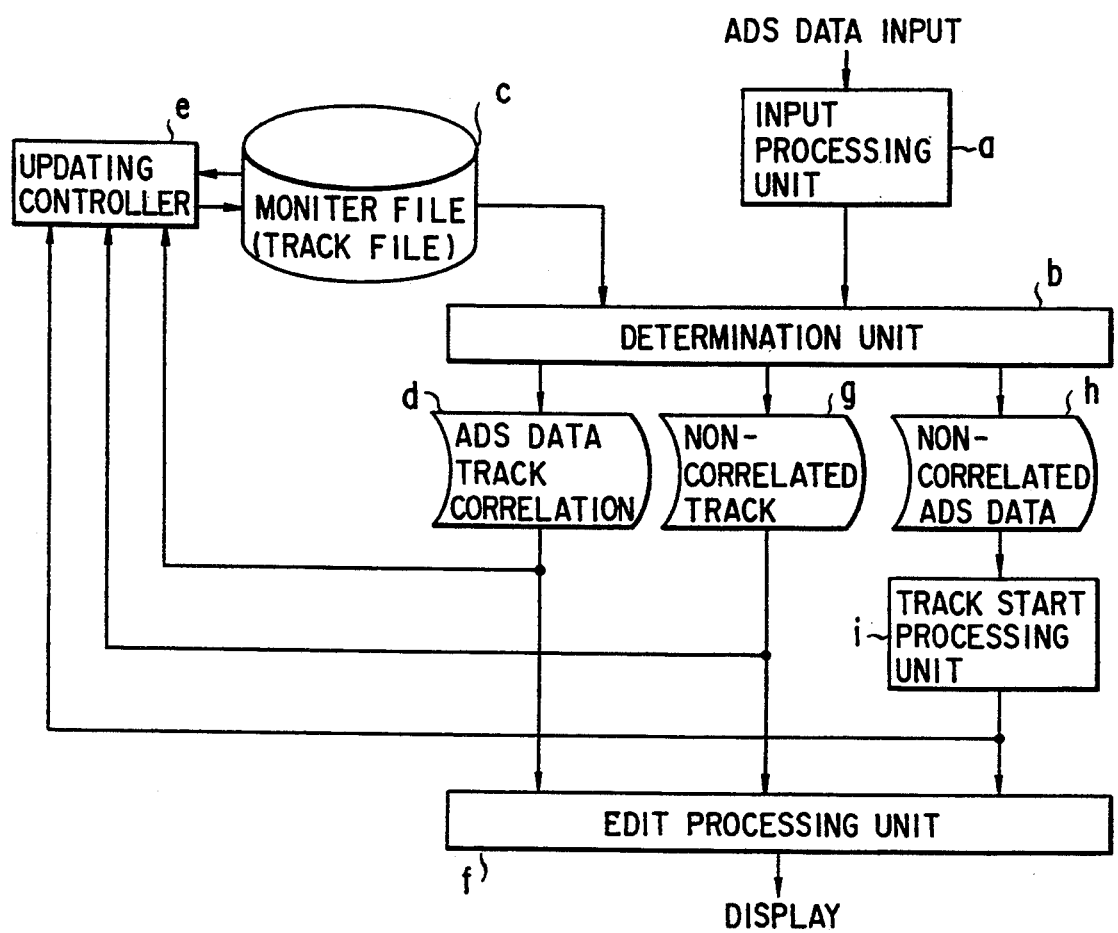
F I G. 3
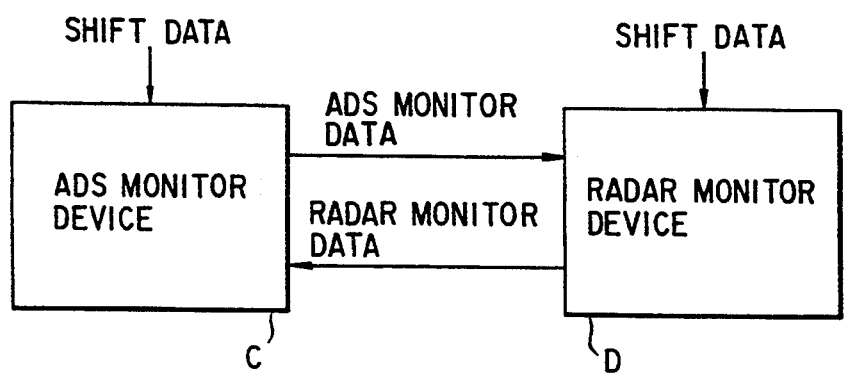
F I G. 6

7-BIT FORMAT

| 1ST BIT | REDUNDANCY IS INDICATED |
|---|---|
| 2ND TO 4TH BITS | POSITION DETERMINATION PRECISION IS INDICATED |
| 5TH BIT | THE STATE IN WHICH TCAS (COLLISION PREVENTION SYSTEM) IS INDICATED |
| 6TH TO 7TH BITS | AUXILIARY |

FIG. 5A

REDUNDANCY (1ST BIT -- TWO STAGES)

| 1ST BIT | REDUNDANCY |
|---|---|
| 0 | TWO OR MORE NAVIGATION DEVICES MAINTAIN PRECISION INDICATED BY 2ND TO 4TH BITS |
| 1 | ONE NAVIGATION DEVICE MAINTAINS PRECISION INDICATED BY 2ND TO 4TH BITS |

POSITION DETERMINATION PRECISION (2ND TO 4TH BITS --- 8 STAGES)

| 2ND TO 4TH BITS | | | POSITION DETERMINATION PRECISION (95% POSSIBILITY) | ADS CLOCK ERROR | GROUNDS FOR POSITION DETERMINATION PRECISION |
|---|---|---|---|---|---|
| DECIMAL INDICATION | 4 3 2 | | | | |
| 0 | 0 0 0 | | LOSS OF NAVIGATION FUNCTION | N/A | POSITION DETERMINATION FAILURE WITH A PRECISION OF 30 NM OR LESS IS REGARDED AS LOSS OF NAVIGATION FUNCTION. |
| 1 | 0 0 1 | | 30NM OR LESS | ±1 SEC | LONG-TIME NAVIGATION WITHOUT INS CALIBRATION. OR, ESTIMATED NAVIGATION FOR 1.5 HOURS OR MORE. OR, VERY REMORT NDB IS USED. |
| 2 | 0 1 0 | | 15NM OR LESS | ±1 SEC | NAVIGATION IN A PACIFIC ROUTE FOR 7 TO 7.5 HOURS, USING INS WITH A DEVIATION OF 2 NM PER HOUR. |
| 3 | 0 1 1 | | 8NM OR LESS | ±1 SEC | NAVIGATION IN AN ATLANTIC ROUTE FOR 3.5 TO 4 HOURS, USING INS. IN ADDITION, INLAND OR, INS-OMEGA IS USED. FLIGHT AT A LOCATION OVER 50 NM FROM VOR. |
| 4 | 1 0 0 | | 4NM OR LESS | ±1 SEC | NAVIGATION OF LESS THAN 2 HOURS, USING INS. OR, INLAND FLIGHT AT A LOCATION 50NM OR LESS FROM VOR. |
| 5 | 1 0 1 | | 1NM OR LESS | ±1 SEC | A $\rho-\rho$ (RNAV) NAVIGATION METHOD, USING DMES. |
| 6 | 1 1 0 | | 0.25NM OR LESS | ±1 SEC | "ABSOLUTE" PRECISION BASED ON LORAN-C GROUND WAVES IS USED. |
| 7 | 1 1 1 | | 0.05NM OR LESS | GPS | GPS POSITION ESTIMATION IS USED. |

AIRCRAFT POSITION MONITORING SYSTEM

BACKGROUND OF THE INVENTION

1. Field of the Invention

The present invention relates to an aircraft position monitoring system for continuously monitoring the present positions of many aircraft.

2. Description of the Related Art

In the prior art, when the present positions of many aircraft during navigation are monitored by a ground station, the position data obtained by a radar is displayed on a display device. On the other hand, the position of an aircraft flying outside the range of a radar (i.e. on the sea) is monitored such that the pilot acquires position data periodically from a navigation system mounted in the aircraft, the data is delivered to the ground station via a voice communication system, and an air traffic controller receives the data and records the data.

Conventionally, in the voice communication system, electric waves of an HF band are reflected by the ionosphere. Although this technique is suitable for long-distance communication, a wide band cannot be obtained and S/N is low. Thus, the communication capacity is limited and the communication quality is not sufficient.

Because of the limitation to the communication capacity, the number of communication lines is limited and the control interval must be increased for communication with many aircraft. In particular, in the air traffic control communication for aircraft flying in an oceanic airspace, the repeating rate of position data reporting of an aircraft is about once per hour, and thus the traffic volume has to be limited. In addition, the problem of communication quality may prevent smooth communication between pilots and air traffic controllers and the traffic safety may not be maintained.

In order to solve the above problems and cope with the increasing traffic volume, while ensuring traffic safety, an ADS (Automatic Dependent Surveillance) system has been developed and is being standardized worldwide. Specifically, according to the ADS system, air/ground communication lines having wide coverage and high quality (e.g. by satellite communication) are employed, and position data is automatically transmitted from the aircraft to the ground station at short cycles. The aircraft position is displayed on a display device on the basis of the data received by the ground station. Thereby, the position of aircraft can be continuously monitored in real time.

In the ADS system which is proposed at present, it is considered to use, as data to be transmitted from an aircraft to the ground station, three-dimensional aircraft position data and identification (ID) data (aircraft ID), as well as data relating to the time of position data acquisition, the velocity of the aircraft, the course of the aircraft, the wind, the temperature, etc. These data items are generally called ADS data or ADS message. Further, data relating to position determination precision and presence/absence of redundancy in the case of providing a plurality of navigation systems is included in the ADS data (this is called "FOM" (Figure of Merit)).

As a navigation system with which an aircraft can detect its own position, there are generally known an INS (Inertial Navigation System) and a GNSS (Global Navigation Satellite System); typically, GPS (Global Positioning System).

In the meantime, ADS data transmitted automatically from many aircraft must be edited and processed at the ground station by a desired communication line and a computer, thereby displaying positions of aircraft which can easily be recognized by controllers or others. Although there have been proposed various display modes, it is suitable to employ a display mode similar to radar display which has long been used in air traffic control fields. Such radar display shows an image or symbol indicating a two-dimensional position of the aircraft, as well as the type of aircraft, altitude, and other necessary data.

According to the radar display mode, the position and ID data is derived from the ADS data transmitted periodically from the aircraft, the data is collated with prepared navigation schedule data, and the data is edited for easy recognition on the basis of the collation result. However, it is troublesome to perform editing each time the data is transmitted, and the data processing amount of the system may be limited. Furthermore, when the aircraft position control is to be performed by using the ADS data including the FOM data, the data processing will become more troublesome.

There is a simpler method in which the tracking processing technique used in the air traffic control radar is employed. In the tracking processing technique, on the basis of a preceding position track of a target (aircraft), a subsequent position range of the target is estimated and the position data in the estimated range is considered as the data of the same target.

When the tracking processing technique is applied to a navigation position monitoring system using ADS data, the FOM data must be taken into account in order to set an optimal estimated range. The processing for setting the estimated range is very troublesome and difficult, and the data processing amount of the system increases.

In order to simplify the tracking processing, the estimated range may be determined irrespective of the FOM data. In this case, however, if the estimated range is too narrow, the tracking processing cannot be started smoothly when the target is initially captured or the navigation system is switched for some reason. Moreover, if the estimated range is too large, the position precision of the tracking processing is lost.

As has been stated above, it has been strongly desired that an aircraft position monitoring system be constructed by effectively utilizing FOM data, thereby realizing simple tracking processing and real-time, continuous aircraft navigation, while preventing an increase in data processing amount.

SUMMARY OF THE INVENTION

The target of the present invention is to provide an aircraft position monitoring system capable of realizing simple tracking processing and real-time, continuous aircraft navigation, while effectively utilizing FOM data and preventing an increase in data processing amount, thereby coping with the increasing traffic volume and ensuring navigation safety.

According to the present invention, there is provided an aircraft position monitoring system for monitoring the position of aircraft in a ground station, the system comprising:

first monitor data acquisition means, provided in each of the aircraft, for acquiring, from a navigation device mounted in each aircraft, monitor data including aircraft position data and aircraft position determination precision data and aircraft identification (ID) data accompanying the position data;

air/ground communication means for sending the monitor data to the ground station from each aircraft;

an interface for receiving the monitor data sent from each aircraft by the air/ground communication means;

first tracking processing means for collating the monitor data received by the interface with a track file prepared on the basis of flight schedule data for each aircraft, determining whether the monitor data meets conditions, and updating the existing track or preparing a new track on the basis of the determination result, thereby performing the tracking processing of each aircraft; and a display device for displaying, in a predetermined display mode, the position data and ID data of each aircraft on the basis of the monitor data processed by the tracking processing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a block diagram showing a specific structure of a tracking processing unit shown in FIG. 2;

FIGS. 5A, 5B and 5C show bit structures of FOM (by ARINC characteristic 745) employed in the embodiment; and FIG. 6 is a block diagram showing the structure of the embodiment in which an ADS monitoring device and a radar monitoring device are employed.

DETAILED DESCRIPTION OF THE PREFERRED EMBODIMENTS

An embodiment of the present invention will now be described with reference to the accompanying drawings.

Figure 1:
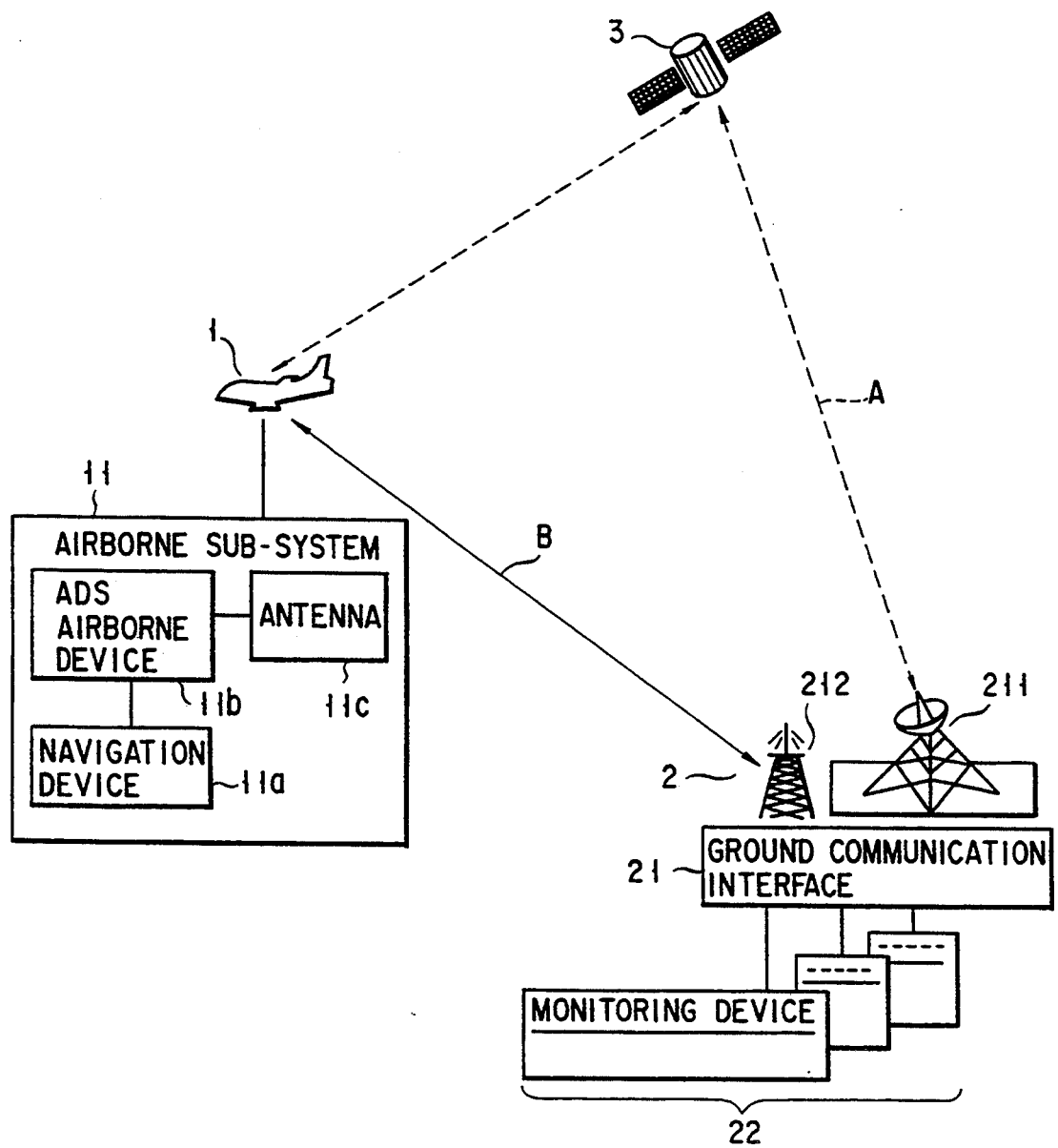
FIG. 1 shows the entire structure of an aircraft position monitoring system according to an embodiment of the present invention.

FIG. 1 shows the entire structure of an aircraft position monitoring system according to the present invention. An aircraft 1 has an airborne sub-system 11 comprising a navigation device (e.g. GPS, INS) 11a, an ADS airborne device 11b and an antenna 11c. In the airborne sub-system 11, the position data and additional data of the aircraft 1 obtained by the navigation device 11a is automatically and periodically obtained by the ADS airborne device 11b, and the obtained data (hereinafter referred to as "ADS data") is transmitted to a ground station 2 via an antenna 11c. A satellite communication line A by means of a satellite (e.g. GPS satellite) 3 or a direct data communication line B is used for ADS data transmission.

The ADS data includes aircraft ID data and FOM data (relating the position determination precision and the presence/absence of the redundancy in the case where two or more navigation devices are mounted).

The ground station 2 is provided with a communication interface 21. The interface 21 includes a satellite communication antenna 211 for communication with the aircraft 1 via the satellite communication line A or the data communication line B. The ADS data from the aircraft 1 received by the communication interface 21 is sent to a monitoring device 22. Two or more monitoring devices 22 may be provided at different areas.

Figure 2:
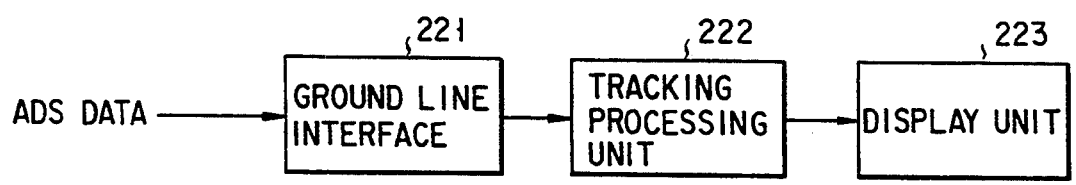
FIG. 2 is a block diagram showing a specific structure of an ADS monitoring device according to the embodiment.

FIG. 2 shows the structure of the monitoring device 22. The ADS data fed from the communication interface 21 is input to the monitoring device 22 via the ground line interface 221. The ADS data is processed by the tracking processing unit 222, and the position of the aircraft is displayed, along with the aircraft ID, on the display unit 223. These functions are generally achieved by the display unit and a computer (or a combination of computers), but part of the functions may be achieved by the hardware. In this case, several structures may be used.

FIG. 3 shows the concept of the structure of the tracking processing unit 222. Specifically, in the tracking processing unit 222, the ADS data (serial data) input from the ground line interface 221 is converted to parallel data by an input processing unit a, and the parallel data is fed to a determination unit b. The determination unit b collates the input ADS data with the track data of a monitor file (track file) c prepared based on navigation schedule data of the aircraft, thereby determining correlation/non-correlation. The determination is performed by referring to the FOM data of the ADS data.

Figure 4:
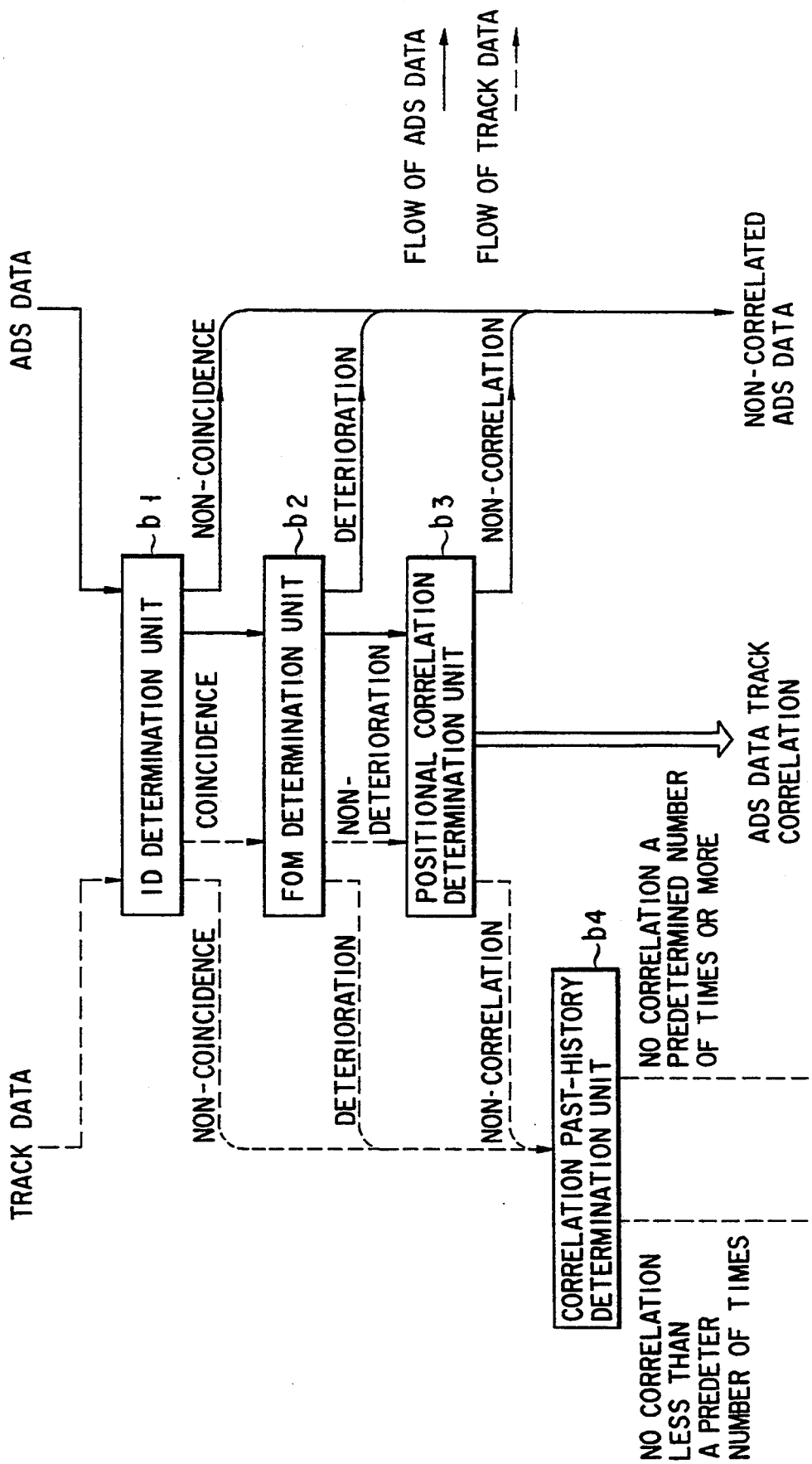
FIG. 4 is a block diagram showing a specific structure of a determination unit shown in FIG. 3.

FIG. 4 shows the processing in the determination unit b. Specifically, the determination unit b includes a determination routine for determining the presence/absence of correlation between the track data in the monitor file c and ADS data.

The ADS parallel data output from the input processing unit a is fed to an ID determination unit b1. The ID determination unit b1 detects the aircraft ID from the ADS data and searches the track agreeing with the detected aircraft ID, by referring to the monitor file c. The track data of the track which agrees with the aircraft ID is delivered to an FOM determination unit b2, along with the input ADS data.

The FOM determination unit b2 detects previous FOM data from the input track data, and detects current FOM data from the ADS data. By comparing both FOM data, it is determined whether deterioration occurs in the position determination precision or redundancy of the navigation device. If there occurs no deterioration, both ADS data and track data is fed to a positional correlation determination unit b3.

The positional correlation determination unit b3 determines whether there is correlation of positional information between the input ADS data and track data. If there is correlation, the input ADS data is regarded to have correlation with the searched track.

In the determination units b1 to b3, the following data is regarded as non-correlation ADS data: the ADS data, with which the track agreeing with the aircraft ID was not found by the ID determination unit b1; the ADS data, with which deterioration in position determination precision or redundancy of navigation device was found by the FOM determination unit b2; and the ADS data, with which no positional correlation was determined by the positional correlation determination unit b3.

The following track data is fed to a correlation past-history determination unit b4: the track data which did not agree with the aircraft ID in the ID determination unit b1; the track data in the case where deterioration in position determination precision or redundancy of navigation device was found by the FOM determination unit b2; and the track data in the case where positional correlation was determined by the positional correlation determination unit b3.

The correlation past-history determination unit b4 determines how many times the input track data had correlation with the ADS data in the past history. Then, the track with no correlation a predetermined number of times or more is abandoned, and the track data with no correlation less than a predetermined number of times is regarded as non-correlation track.

In the case where ADS data is determined to have correlation with the existing track data, the ADS data is fed to an updating controller e by a first control processing unit d and simultaneously delivered to an edit processing unit f as output for display. The updating controller e updates track data by adding the input ADS data to the data of the track agreeing with the aircraft ID in the monitor file c.

In addition, when there is a non-correlation track or an abandoned track, the information to that effect is sent from a second control processing unit g to the updating controller e and the edit processing unit f. At this time, the updating controller e does not update the data on the non-correlation track, and abandons the track to be abandoned from the monitor file c.

On the other hand, the non-correlation ADS data which has no correlation with the existing track data is sent to a track start processing unit i by a third control processing unit h. The track start processing unit i sends to the updating controller e the information to the effect that a new track is to be prepared, along with the ADS data. Simultaneously, it sends ADS data to the edit processing unit f. The updating controller e forms a new track in the monitor file c and stores the input ADS data as track data.

The edit processing unit f edits the ADS data in conformity with the format of the display unit 223, and sends the edited data to the display unit 223 as processed result of the tracking processing unit 222. The functions of the unit 222 are realized by a computer, custom-designed hardware, a combination thereof, etc.

The operations of the above structure will now be described.

As has been described above, in the aircraft position monitoring system using ADS data, if the display mode similar to data display mode is used, it becomes troublesome to edit data relating to the positions and IDs which is transmitted cyclically from many aircraft, each time the data is transmitted. Consequently, the data processing amount of the system may be limited. Thus, it is thought that tracking processing, which is widely known in the field of signal processing for radar display, is employed. In this case, however, the setting of the estimated range is difficult.

Specifically, when the tracking processing of ADS data is performed, the past-history of the cyclic position data and the target monitor file (track file) based on the flight schedule information are successively updated. Each time new target position data is obtained, the data is coupled to the track file. In other words, on the basis of the target position and the past-history of the data acquisition time, the spatial and temporal ranges in which ADS data is obtained are estimated, and the track file is updated by ADS data obtained in these ranges and correlated with the track file. These operations are repeated.

The conditions of ADS data used in updating the track file are:
1) ADS data must be obtained in the estimated spatial and temporal ranges, and
2) Reliability is ensured.

The monitoring system, however, needs to perform appropriate processing for ADS data which fails to meet the conditions, and to cause no trouble in the target monitoring.

In the present invention, the determination processing as illustrated in FIG. 3 is performed with respect to the ADS data, considering the above conditions. Specifically, the FOM data is used in determining the presence/absence of correlation between the ADS data and the existing track data.

Next, the determination of correlation in the case of using the FOM data, for example, will now be described. The currently used FOM data has a 7-bit format. As is shown in FIG. 5, the position determination precision is indicated by the 2nd to 4th bits. The 1st bit indicates the redundancy as to whether or not the position determination precision is obtained by two or more navigation devices.

Suppose, as a first example, that a navigation device (with no auxiliary device) of an aircraft, which flying with a high navigation precision of level 5 or above, malfunctioned and the navigation precision lowered to level 0. In this case, the monitoring device 22 recognizes that the tracking based on ADS data of aircraft is no longer possible, and necessary steps such as detection of the target position are performed by using, for example, a primary radar and a secondary radar.

Suppose, as a second example, that an aircraft using a GPS receiver in the navigation device 11a acquired a sufficient number of satellites and navigated with navigation precision level 7 maintained, but the number of acquired satellites decreased at a certain time point and the aircraft was forced to use an alternative navigation device (i.e. the navigation precision is lowered to level 2). In this case, the position determination precision of the alternative navigation device is low, and even if the tracking processing is to be continued by the monitoring device 22, it is highly possible that the correlation between the ADS data and the existing track data is found. Thus, the monitoring device 22 recognizes the decrease in level of FOM, and the existing track file is abandoned and a new track file is prepared. Then, the tracking processing is continued.

In the aircraft position monitoring system having the above structure, the presence/absence of correlation between ADS data and track data is determined before the ADS data is edited. When there is correlation, the track data is updated. When there is no correlation, a new track file is prepared on the basis of the ADS data. Thus, even if position data and ID data is sent from many aircraft, the aircraft tracking processing and position display processing can be achieved and real-time, continuous aircraft monitoring can be performed. Therefore, the aircraft position monitoring system can cope with the increasing traffic volume, and simultaneously the navigation safety can be enhanced.

within the radar coverage, the aircraft position can be monitored on the basis of radar data, as stated above. Thus, both ADS monitor data and radar monitor data may be used.

FIG. 6 illustrates monitor data transmission between an ADS monitor device C and a radar monitor device D. For example, when shift of monitor function is effected between the ADS monitor device and the radar monitor device D, this fact is recognized and displayed.

For example, suppose that the radar control of an aircraft was shifted to the ADS control before the aircraft reached the radar coverage limit. In this case, the ADS monitor device C receives the radar monitor data at the time of transfer, and if there is correlation between the radar monitor data and ADS monitor data, the tracking is continued or the same processing as in the above-described second example is performed.

By performing data transfer between the radar monitor device and the ADS monitor device, the shift of monitor function between the radar monitor and ADS monitor can smoothly be performed.

The present invention is not limited to the above embodiment. For example, ADS data on position determination precision, etc., may be transmitted by a method other than using FOM data. Other modifications may be made to the present invention without departing from the spirit of the invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An aircraft position monitoring system for monitoring the position of each of a plurality of aircraft in a ground station, the system comprising:

first monitor data acquisition means, provided in each aircraft, for automatically and periodically acquiring, from a navigation device mounted in each aircraft, position data and monitor data including aircraft position determination precision data and aircraft identification (ID) data which accompany the position data;

air/ground communication means for sending the monitor data to the ground station from each aircraft;

an interface, provided in the ground station, receiving the monitor data sent from each aircraft by the air/ground communication means;

a track file, provided in the ground station, which stores track data including the position data and the position determination precision data in units of ID data of each aircraft, and stores track data prepared on the basis of flight schedule data for each aircraft in an initial state;

first tracking processing means provided in the ground station, the first tracking processing means including:

ID data determination means for retrieving, from the track file, track data which coincides with the ID data included in the monitor data received by the interface;

data storage means for allowing the contents of the monitor data to be stored as new track data in the track file, when the ID data determination means retrieves no track data which coincides with the ID data;

deterioration determining means for comparing the position determination precise data included in the monitor data with the previous position determination precise data included in the track data which coincided with ID data, determining whether or not there is deterioration in the position determination precise data included in the monitor data, and discarding the monitor data when there is deterioration in the position determination precise data included in the monitor data;

position correlation determining means for determining whether or not there is correlation between position data included in the monitor data which have been determined to be free from deterioration and the previous position data included in the track data; and track data updating means for adding data contents of the monitor data which correlates to ID track data included in the track file, when the position correlation determining means determines that there is correlation between the position data and the previous position data, and replacing contents of ID track data with contents of the monitor data, when there is no correlation between the position data and the previous position data; and display means, provided in the ground station, for displaying the position of each of the aircraft and the ID in a predetermined format on the basis of the monitor data processed by the first tracking processing means.

2. The aircraft position monitoring system according to claim 1, further comprising:

second monitor data acquisition means, provided in the ground station, for acquiring ID data and position data of aircraft flying in a radar coverage area by a radar;

second tracking processing means for performing tracking processing of the aircraft detected by the radar on the basis of the ID data and position data acquired by the second monitor data acquisition means; and data transfer means for transferring the monitor data of the first tracking processing means to the second tracking processing means, and the monitor data of the second tracking processing means to the first tracking processing means.

* * * * *